USOO5099445A

United States Patent [19]
Studor et al.

[11] Patent Number: 5,099,445
[45] Date of Patent: Mar. 24, 1992

[54] VARIABLE LENGTH SHIFTER FOR PERFORMING MULTIPLE SHIFT AND SELECT FUNCTIONS

[75] Inventors: Charles F. Studor; Robert Skruhak, both of Austin, Tex.

[73] Assignee: Motorola, Inc., Schaumburg, Ill.

[21] Appl. No.: 457,051

[22] Filed: Dec. 26, 1989

[51] Int. Cl.$^5$ .............................................. G06F 7/00
[52] U.S. Cl. ............................................... 364/715.08
[58] Field of Search .................... 364/715.08, 748, 900

[56] References Cited

U.S. PATENT DOCUMENTS

| | | | |
|---|---|---|---|
| 4,437,166 | 3/1984 | O'Brien | 364/715.08 X |
| 4,509,144 | 4/1985 | Palmer et al. | 364/900 |
| 4,636,976 | 1/1987 | Takla | 364/715.08 |
| 4,653,019 | 3/1987 | Hodge et al. | 364/715.08 |
| 5,020,013 | 5/1991 | Maher, III et al. | 364/715.08 |

Primary Examiner—Tan V. Mai
Attorney, Agent, or Firm—Paul J. Polansky

[57] ABSTRACT

A variable length shifter for performing multiple shift and select functions. The shifter has a number of cells equal to an operand length, ordered from a most significant to a least significant, or leftmost to rightmost. Each cell stores a bit of the operand, and is coupled to each adjacent cell and to a cell four bits adjacent in either direction, if any. In addition, each cell is coupled to a return bus for implementation of boundary conditions associated with the operation. Besides being expandable to an arbitrary size operand, the shifter implements a register select function using primarily existing circuitry.

13 Claims, 4 Drawing Sheets

VARIABLE LENGTH SHIFTER FOR PERFORMING MULTIPLE SHIFT AND SELECT FUNCTIONS

FIELD OF THE INVENTION

This invention relates generally to logic circuits, and more particularly, to logic circuits for microprocessor applications.

BACKGROUND OF THE INVENTION

A data processor requires a variety of shift operations to implement its instruction set. The shift operations can include left shifts, right shifts, and rotates. The shifts can be arithmetic or logical, which determines how bits at either end of the operand are handled. Each shift or rotate operation has a variable length. Which bit is shifted into a given bit position is determined by the type of shift operation. There is a tradeoff involved in designing circuitry to implement shift and rotate operations on an operand. The area on the integrated circuit used for the circuitry to perform the operations affects the performance of the operation, measured in number of clock cycles to complete the operation.

At one extreme, a barrel shifter performs a full matrix of operations on an operand. For example, if the barrel shifter is 32 bits wide, each of the 32 bits is selectively coupled directly to each of the other 31 bits. Which bits are coupled together for an operation is determined by the length and direction of the operation being performed. The barrel shifter maximizes the performance of the shifter, but also consumes a maximum of space. At the other extreme, a simple shifter shifts only one bit at a time. To implement shifts of larger lengths, a control section must use consecutive one-bit shift operations until the specified length is reached. This type of shifter uses much less area than the barrel shifter, but performance is greatly diminished. How to optimize the chip area-performance tradeoff is a significant problem in data processor design. Another problem is that when the operand size of the data processor is increased or decreased, the shifter redesign may be quite complicated.

Another use of chip area occurs in the implementation of certain instructions. An example is the move multiple registers (MOVEM) instruction. Data processors receive instructions from software to do certain functions, and the instructions are often contained in two or more 16-bit words. In the MOVEM instruction, the first word is an operation code (opcode), which indicates the type of instruction, and the second word is a mask, which indicates which registers are affected. In the second word of a MOVEM instruction, a '1' in a bit position in the mask word indicates that the move instruction is to be carried out on a register which corresponds to that bit position. To implement an instruction with such a mask, special hardware circuitry is usually required to take the mask word and generate select signals at the appropriate time. Special circuitry for implementing the MOVEM instruction, therefore, also requires chip area.

BRIEF DESCRIPTION OF THE INVENTION

Accordingly, it is an object of the present invention to provide a shifter of variable length for performing multiple shift operations.

It is another object of the present invention to provide a shifter which optimizes a tradeoff between chip area and performance for particular applications.

It is yet another object of the present invention to provide a shifter which generates register select signals from an instruction mask.

In carrying out these and other objects of the invention, there is provided, in one form, a shifter in an integrated circuit for performing a plurality of shift operations comprising a control portion, a plurality of cells, a shift path, and a return portion. The control portion provides at least one control signal in response to a selected shift operation. The plurality of cells is ordered from a leftmost cell to a rightmost cell and stores an operand. Each cell of the plurality of cells stores a bit of the operand. The shift path is coupled to the plurality of cells and to the control portion, and receives the plurality of control signals, and selectively couples each cell to either an adjacent cell, or a cell separated by a predetermined number of intervening cells. The return portion is coupled to the plurality of cells and to the control portion, and couples each of a predetermined set of cells of the plurality of cells to a corresponding cell in response to a boundary condition of the selected shift operation.

These and other objects, features and advantages will be more clearly understood from the following detailed description taken in conjunction with the accompanying drawings.

DETAILED DESCRIPTION OF THE INVENTION

Figure 1:
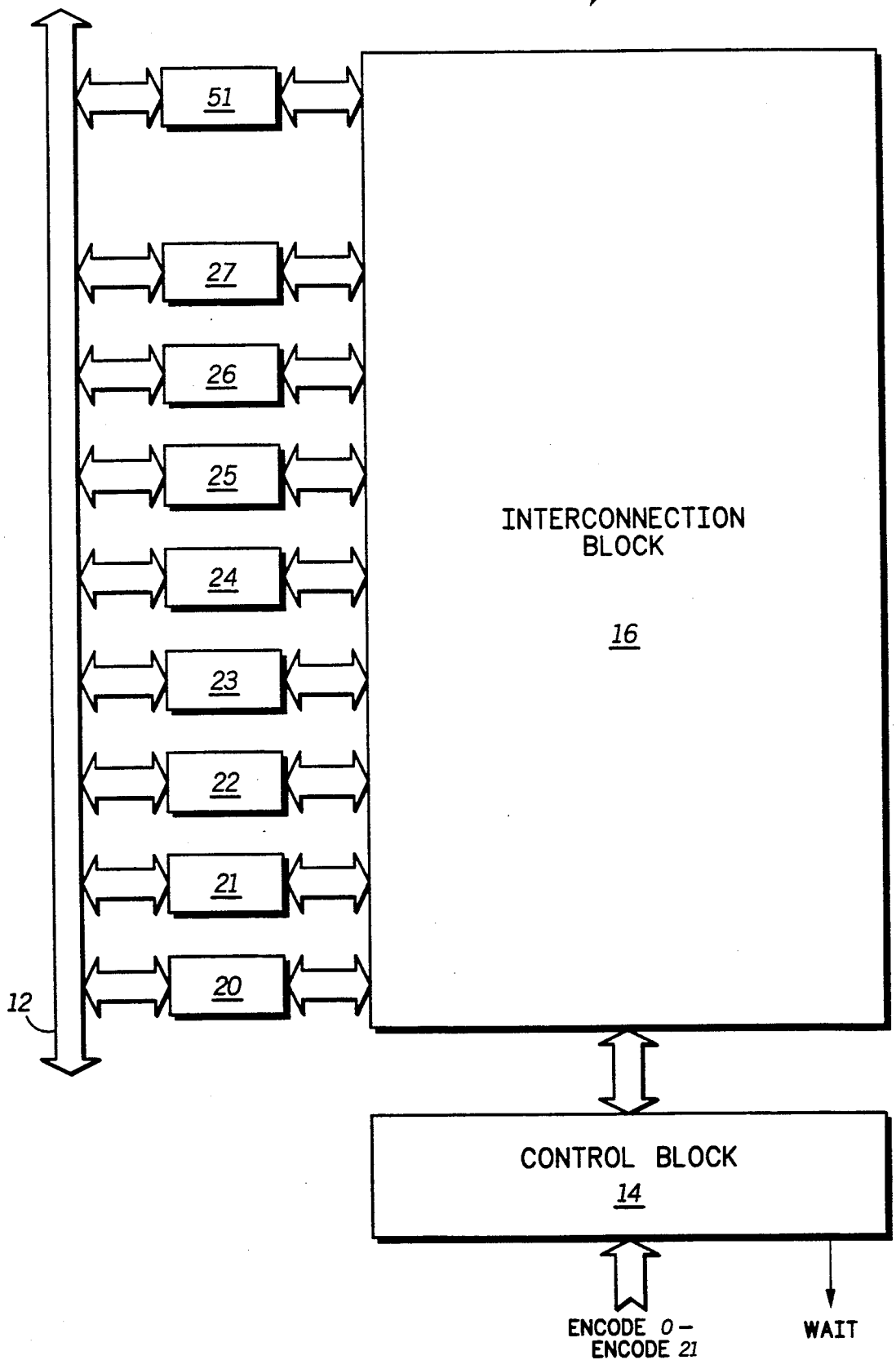
FIG. 1 shows a block diagram of a shifter in accordance with a preferred embodiment of the present invention.

FIG. 1 shows a shifter 10 in accordance with a preferred embodiment of the present invention, and a programming bus 12. Shifter 10 comprises a control block 14, an interconnection block 16, an operand bit cell 20, an operand bit cell 21, an operand bit cell 22, an operand bit cell 23, an operand bit cell 24, an operand bit cell 25, an operand bit cell 26, an operand bit cell 27, and an operand bit cell 51. Control block 14 receives twenty-two encoded signals labelled ENCODE0-ENCODE21. Control block 14 couples a plurality of control signals to interconnection block 16 and provides a signal labelled WAIT. Interconnection block 16 and provides a signal labelled WAIT. Interconnection block 16 couples to each of a plurality of cells, which in a preferred embodiment total 32. Cells 20-27 and 51 are shown as representative cells. Cell 20 couples three signals to interconnection block 16 labelled C0P1, C0P1A, and C0P2. Cell 21 and cell 22 couple signals labelled C1P1, C1P2, C2P1, and C2P2, respectively, to interconnection block 16. Cell 23 couples signals labelled C3P1, C3P1A, and C3P2 to interconnection block 16. After cell 23, each cell couples either two signals or three signals to interconnection block 16.

Two signals coupled by each cell provide a first port and a second port for shift operations and boundary conditions. The third signal provides for a boundary condition of a particular shift operation. In addition, each cell couples a plurality of signals to programming bus 12.

Cells 20–27 and 51 are part of 32 operand bit cells of shifter 10. The cells collectively form a 32-bit operand, with each cell corresponding to a bit in the operand. A most-significant, or leftmost, bit corresponds to cell 51. A least significant, or rightmost, bit corresponds to cell 20. In between are cells corresponding to bits 30-1, and are thus ordered from most significant to least significant, or left to right. The contents of the plurality of cells are written to or read from via programming bus 12. While programming bus 12 can be implemented in many ways depending on the application, in the preferred embodiment programming bus 12 comprises two 32-bit data buses, and control signals controlling the initiation, timing, and direction of the data transfer.

A shift operation is performed on an operand loaded into cells 0–31 by first decoding a selected operation type. The bits ENCODE0-ENCODE21 encode a shift operation. Shifter 10 is part of a data processor comprising a microcode machine to control reading and decoding of an instruction set, and an execution unit. The microcode machine provides ENCODE0-ENCODE21 to control various hardware circuits in the data processor, including the shifter. The shifter must decode ENCODE0-ENCODE21 to provide exact hardware signals to control the operation. Control block 10 provides a plurality of control signals to interconnection block 16 to control the shifting of operand bits between various cells.

Shifter 10 combines some features of a simple shifter and some features of a barrel shifter to optimize a tradeoff between speed and chip area for particular applications. Shifter 10 allows shifting, in either a left or a right direction, of one or four bits in a single clock period. Since shifter 10 is part of a data processor, shift lengths are commonly in powers of two, so that providing shifts by one and by four allows shifter 10 to easily implement the more common shift lengths. A less common shift operation, for example a left shift of six bits (X6), comprises a left shift of four bits, followed by two left shifts of one bit. The left shift of six bits takes three clock periods, compared to one clock period for the barrel shifter, and six clock periods for the simple shifter. Therefore, for more common shifts shifter 10 provides performance close to or equal to that of a barrel shifter, and for less common shifts shifter 10 provides performance intermediate to that of a barrel shifter and that of a simple shifter. In other embodiments, shifts by one and a number other than four can be implemented by choosing a predetermined number of intervening cells to be a number other than three, to optimize performance for particular applications. Control block 14 counts the number of transfers until the operation is complete. In the left shift X6 operation, control block 14 asserts signal WAIT to the microcode to indicate that a shift was not completed by the end of the first clock period.

Figure 2:
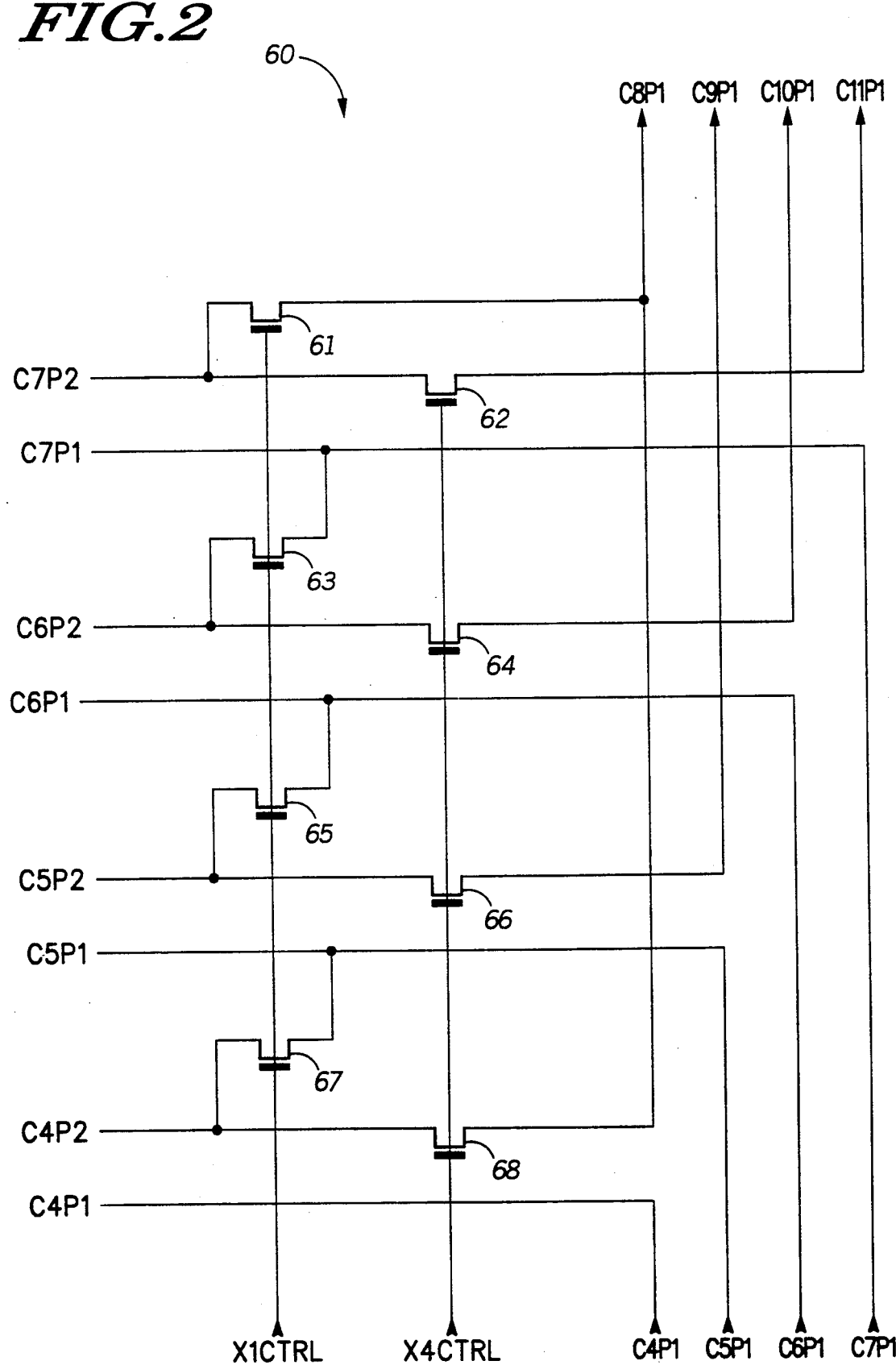
FIG. 2 illustrates in schematic form a portion of the shifter of FIG. 1.

More particularly, FIG. 2 illustrates a portion 60 of interconnection block 16 of FIG. 1 showing circuitry implementing shifts by one and shifts by four. FIG. 2 comprises an N-channel transistor 61, an N-channel transistor 62, an N-channel transistor 63, an N-channel transistor 64, an N-channel transistor 65, an N-channel transistor 66, an N-channel transistor 67, and an N-channel transistor 68. Transistor 61 has a first current electrode coupled to a signal labelled C7P2, a control electrode for receiving a signal labelled X1CTRL, and a second current electrode coupled to a signal labelled C8P1. Transistor 62 has a first current electrode coupled to C7P2, a control electrode for receiving a signal labelled X4CTRL, and a second current electrode coupled to a signal labelled C11P1. Transistor 63 has a first current electrode coupled to a signal labelled C6P2, a control electrode for receiving X1CTRL, and a second current electrode coupled to a signal labelled C7P1. Transistor 64 has a first current electrode coupled to C6P2, a control electrode for receiving X4CTRL, and a second current electrode coupled to a signal labelled C10P1. Transistor 65 has a first current electrode coupled to a signal labelled C5P2, a control electrode for receiving X1CTRL, and a second current electrode coupled to a signal labelled C6P1. Transistor 66 has a first current electrode coupled to C5P2, a control electrode for receiving X4CTRL, and a second current electrode coupled to a signal labelled C9P1. Transistor 67 has a first current electrode coupled to a signal labelled C4P2, a control electrode for receiving X1CTRL, and a second current electrode coupled to a signal labelled C5P1. Transistor 68 has a first current electrode coupled to C4P2, a control electrode for receiving X4CTRL, and a second current electrode coupled to a signal labelled C8P1.

When a X1 shift occurs, X1CTRL is a logic high and transistors 61, 63, 65, and 67 are conductive. X1CTRL and X4CTRL may not both be asserted at one time. Each operand cell comprises two ports for shifting the stored bit. During the X1 shift, the second ports of cells 7, 6, 5, and 4, respectively, are coupled to the first ports of cells 8, 7, 6, and 5, respectively. Also, the first ports of cells 7, 6, 5, and 4 are coupled to the second ports of cells 6, 5, 4, and 3, respectively. Note that the length of the shift, but not the direction, determines which ports are coupled together. In a left shift, port 1 of each cell is the destination port, and port 2 is the source port; in a right shift, port 2 of each cell is the destination port, and port 1 is the source port. When X1CTRL or X4CTRL is asserted, the content of the source port is written into the destination port of a corresponding cell. During a first clock period, denoted phi1, the operand bit stored in a destination port in a cell during a preceding operation updates the source port. During a second clock period, denoted phi2, the operand bit stored in the source port is shifted through the interconnection block, to the destination port. In a preferred embodiment, phi1 and phi2 substantially correspond to periods when a single clock signal with approximately 50% duty cycle is a logic high and a logic low, respectively.

The interconnections for shifting X1 and X4 are the same for each group of four cells, grouped as cells 0–3, 4–7, 8–11, 12–15, 16–19, 20–23, 24–27, and 28–31, except for groups 0–3 and 28–31. Cell group 0–3 does not interconnect with a group on the right since it is the rightmost group, and similarly, cell group 28–31 does not interconnect with a group on the left, since it is the leftmost group. When a left shift or a right shift occurs, the shift operation itself determines what occurs on the rightmost or leftmost cells, respectively. These determinations are called boundary conditions. For example, during a shift operation called an arithmetic shift right, where the shift is n bits in length, the leftmost n cells are loaded with the stored operand bit in the leftmost cell before the shift. For all values of n from 1 to 31 the shift is made up of one or more X1 or X4 operations. Therefore, only X1 or X4 operations need to provide for boundary conditions.

An inherent difficulty in designing a shifter to perform multiple shift operations is to implement the boundary conditions with a minimum of hardware circuitry. For example, suppose a selected operation is a byte rotate left X4. In the byte rotate left X4, not only are the contents of bits 3-0 shifted left into bits 7-4, the contents of bits 7-4 are rotated around and shifted into bits 3-0. One way to implement the rotate condition is to add duplicate shift paths like the shift paths shown in portion 60 of FIG. 2. However, the additional circuitry consumes much integrated circuit area. An alternate design which reduces circuitry under a duplication approach is shown in FIG. 3.

Figure 3:
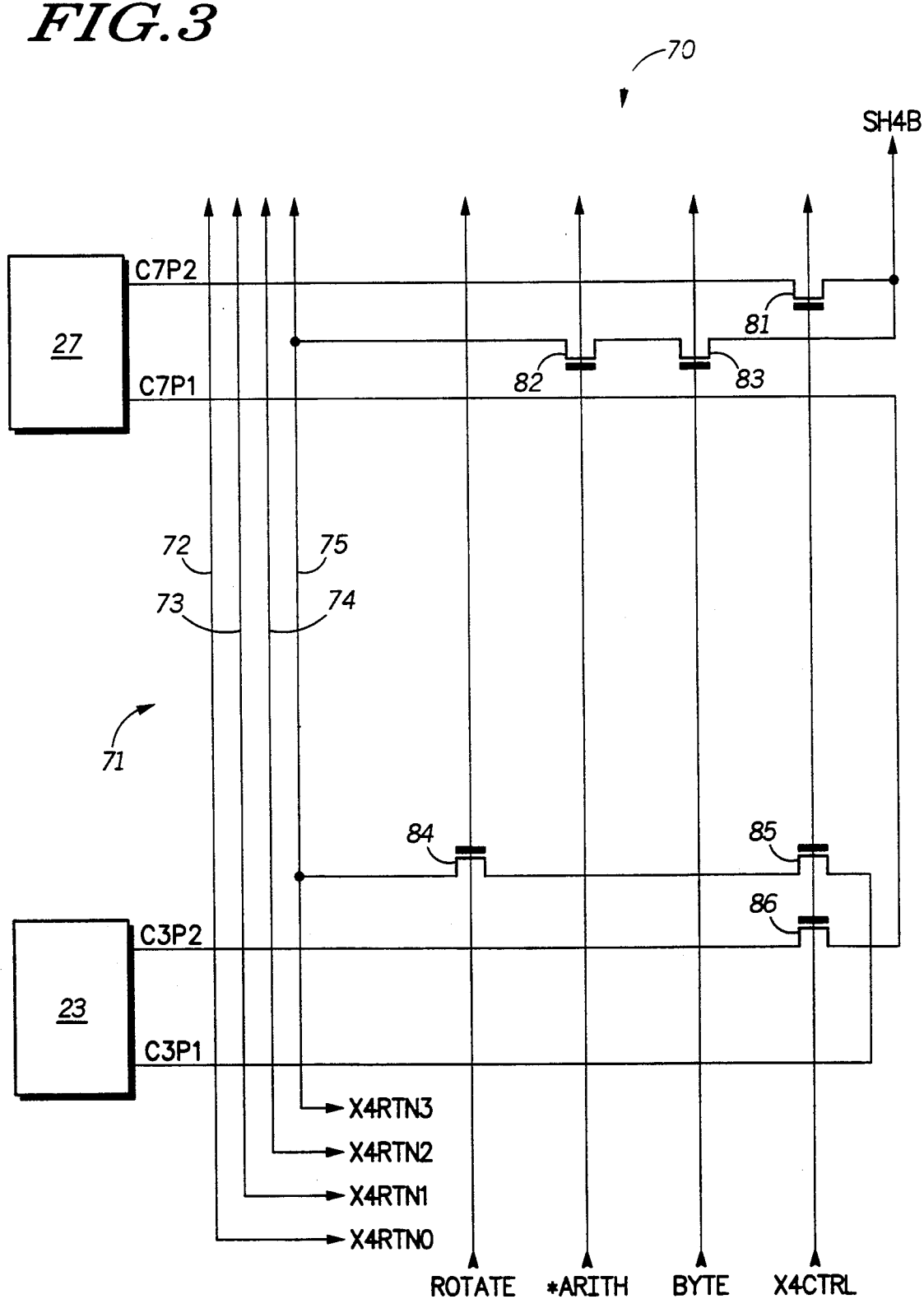
FIG. 3 shows in partial block diagram form and partial schematic diagram form a second portion of the shifter of FIG. 1.

FIG. 3 shows a portion 70 of shifter 10 of FIG. 1. Portion 70 comprises cell 23 and cell 27 as numbered in FIG. 1, a return bus 71, an N-channel transistor 81, an N-channel transistor 82, an N-channel transistor 83, an N-channel transistor 84, an N-channel transistor 85, and an N-channel transistor 86. Bus 71 comprises a return line 72 carrying a signal labelled X4RTN0, a return line 73 carrying a signal labelled X4RTN1, a return line 74 carrying a signal labelled X4RTN2, and a return line 75 carrying a signal labelled X4RTN3. Cell 23 is coupled to C3P1 and C3P2, which may be input signals or output signals depending on the direction of the shift operation. Cell 27 is coupled to C7P1 and C7P2, which may be input signals or output signals depending on the direction of the shift operation. Transistor 81 has a first current electrode for receiving C7P2, a control electrode for receiving X4CTRL, and a second current electrode providing a signal labelled SH4B. Transistor 82 has a first current electrode coupled to line 75, a control electrode for receiving a signal labelled *ARITH, and a second current electrode. Transistor 83 has a first current electrode coupled to the second current electrode of transistor 82, a control electrode for receiving a signal labelled BYTE, and a second current electrode coupled to the second current electrode of transistor 81. Transistor 84 has a first current electrode coupled to line 75, a control electrode for receiving a signal labelled ROTATE, and a second current electrode. Transistor 85 has a first current electrode coupled to the second current electrode of transistor 84, a control electrode for receiving X4CTRL, and a second current electrode coupled to C3P1. Transistor 86 has a first current electrode coupled to C3P2, a control electrode for receiving X4CTRL, and a second current electrode coupled to C7P1.

When a byte rotate left X4 is selected, control block 14 of FIG. 1 drives ROTATE, BYTE, *ARITH, and X4CTRL at a logic high. *ARITH is an active low signal indicating an arithmetic-type shift is in progress. These signals together couple port 2 of cell 27 to port 1 of cell 23. Transistor 86 also couples port 2 of cell 23 to port 1 of cell 27 as shown in FIG. 3. In this way the bits stored in cells 23 and 27 are swapped. Also, port 1 of cell 26 is coupled to port 2 of cell 22 on line 74, port 1 of cell 25 is coupled to port 2 of cell 21 on line 73, and port 1 of cell 24 is coupled to port 2 of cell 20 on line 72 (not shown in FIG. 3). Although the case of a byte rotate left X4 has been shown, return bus 71 provides an interconnection path for boundary conditions of multiple shift operations. The plurality of control signals provided by control block 14 of FIG. 1 control transistors similar to transistors 81–86 in interconnection block 16 to couple cells to return bus 71 to provide bit movement for the boundary conditions.

Figure 4:
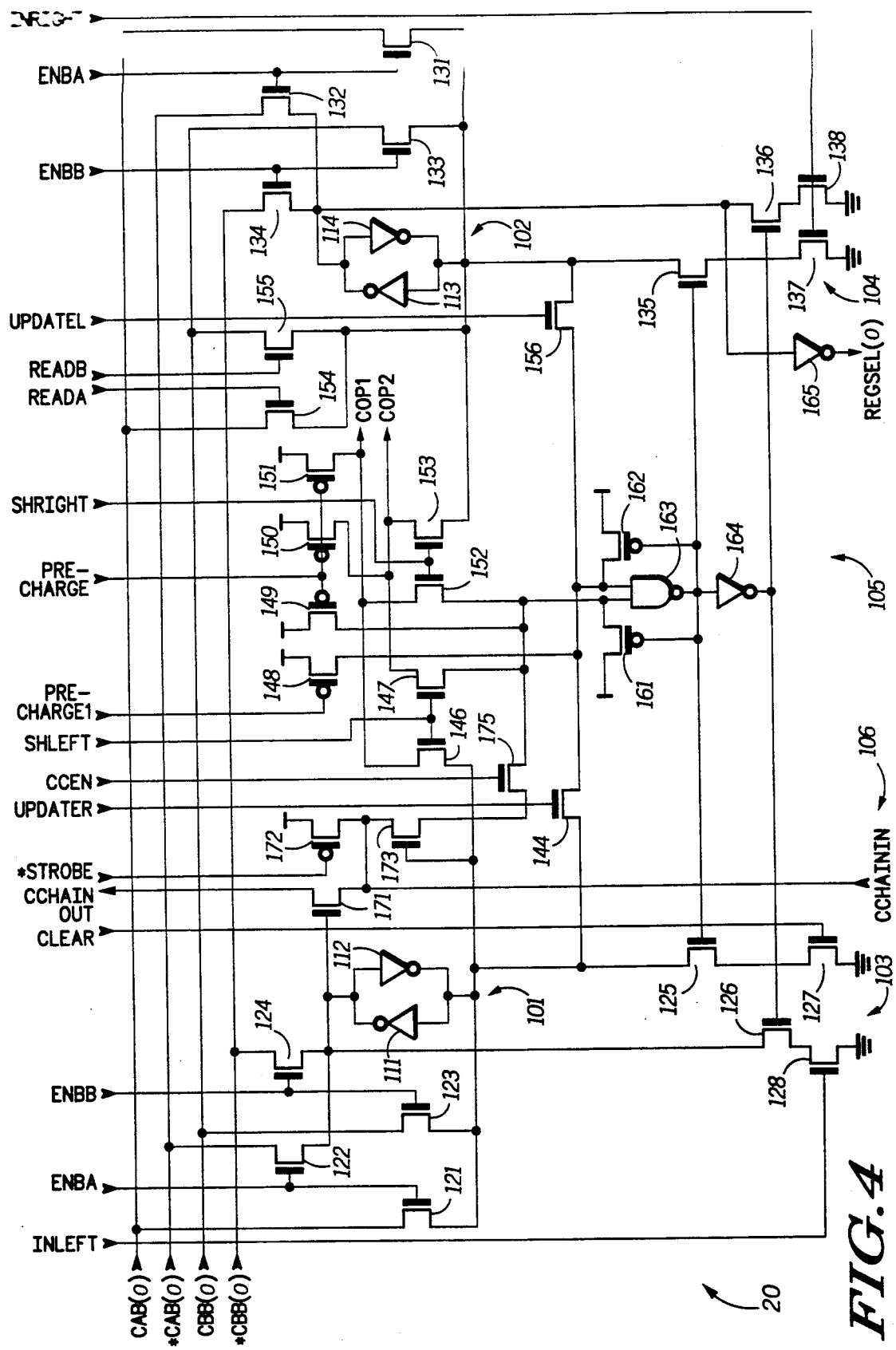
FIG. 4 shows a schematic of one cell of the shifter of FIG. 1 useful in understanding detailed operation and an additional feature of the shifter of FIG. 1.

FIG. 4 shows a schematic of cell 20 of FIG. 1 useful in understanding the invention. Cell 20 is numbered the same as cell 20 in FIG. 1. Cell 20 comprises a master RAM cell 101, a slave RAM cell 102, a master circuit portion 103, a slave circuit portion 104, a common circuit portion 105, and a carry chain portion 106. RAM cell 101 comprises an inverter 111, and an inverter 112. RAM cell 102 comprises an inverter 113, and an inverter 114. Master circuit portion 103 comprises an N-channel transistor 121, an N-channel transistor 122, an N-channel transistor 123, an N-channel transistor 124, an N-channel transistor 125, an N-channel transistor 126, an N-channel transistor 127, an N-channel transistor 128. Slave circuit portion 104 comprises an N-channel transistor 131, an N-channel transistor 132, an N-channel transistor 133, an N-channel transistor 134, an N-channel transistor 135, an N-channel transistor 136, an N-channel transistor 137, an N-channel transistor 138, an N-channel transistor 154, and an N-channel transistor 155. Update portion 105 comprises an N-channel transistor 144, an N-channel transistor 146, an N-channel transistor 147, a P-channel transistor 148, an P-channel transistor 149, a P-channel transistor 150, a P-channel transistor 151, an N-channel transistor 152, an N-channel transistor 153, an N-channel transistor 156, a P-channel transistor 161, a P-channel transistor 162, a NAND gate 163, an inverter 164, and an inverter 165. Carry chain portion 106 comprises an N-channel transistor 171, a P-channel transistor 172, an N-channel transistor 173, and an N-channel transistor 175.

In RAM cell 101, inverter 111 has an input terminal and an output terminal. Inverter 112 has an input terminal connected to the output terminal of inverter 111, and an output terminal connected to the input terminal of inverter 111. In RAM cell 102, inverter 113 has an input terminal and an output terminal. Inverter 114 has an input terminal connected to the output terminal of inverter 113, and an output terminal connected to the input terminal of inverter 113. In master circuit portion 103, transistor 121 has a first current electrode coupled to a signal labelled CAB(0), a control electrode for receiving a signal labelled ENBA, and a second current electrode connected to the input terminal of inverter 111. Transistor 122 has a first current electrode coupled to a signal labelled *CAB(0), a control electrode for receiving ENBA, and a second current electrode connected to the input terminal of inverter 112. Transistor 123 has a first current electrode coupled to a signal labelled CBB(0), a control electrode for receiving a signal labelled ENBB, and a second current electrode connected to the input terminal of inverter 111. Transistor 124 has a first current electrode coupled to a signal labelled *CBB(0), a control electrode for receiving ENBB, and a second current electrode connected to the input terminal of inverter 112. Transistor 125 has a first current electrode connected to the output terminal of inverter 112, a control electrode, and a second current electrode. Transistor 126 has a first current electrode connected to the output terminal of inverter 111, a control electrode, and a second current electrode. Transistor 127 has a first current electrode connected to the second current electrode of transistor 125, a control electrode for receiving a signal labelled CLEAR, and a second current electrode connected to a negative power supply voltage terminal $V_{SS}$, at approximately 0 volts. Transistor 128 has a first current electrode connected to the second current electrode of transistor 126, a control electrode for receiving a signal labelled IN-LEFT, and a second current electrode connected to $V_{SS}$.

In slave circuit portion 104, transistor 131 has a first current electrode coupled to CAB(0), a control electrode for receiving ENBA, and a second current electrode connected to the input terminal of inverter 113. Transistor 132 has a first current electrode coupled to *CAB(0), a control electrode for receiving ENBA, and a second current electrode connected to the input terminal of inverter 114. Transistor 133 has a first current electrode coupled to CBB(0), a control electrode for receiving ENBB, and a second current electrode connected to the input terminal of inverter 113. Transistor 134 has a first current electrode coupled to *CBB(0), a control electrode for receiving ENBB, and a second current electrode connected to the input terminal of inverter 114. Transistor 135 has a first current electrode connected to the output terminal of inverter 114, a control electrode, and a second current electrode. Transistor 136 has a first current electrode connected to the output terminal of inverter 113, a control electrode, and a second current electrode. Transistor 137 has a first current electrode connected to the second current electrode of transistor 135, a control electrode for receiving a signal labelled INRIGHT, and a second current electrode connected to $V_{SS}$. Transistor 138 has a first current electrode connected to the second current electrode of transistor 136, a control electrode for receiving INRIGHT, and a second current electrode connected to $V_{SS}$. Transistor 154 has a first current electrode connected to CAB(0), a control electrode for receiving a signal labelled READA, and a second current electrode coupled to the output terminal of inverter 114. Transistor 155 has a first current electrode for receiving CBB(0), a control electrode for receiving a signal labelled READB, and a second current electrode connected to the output terminal of inverter 114.

In common circuitry portion 105, Transistor 144 has a first current electrode connected to the output terminal of inverter 112, a control electrode for receiving a signal labelled UPDATER, and a second current electrode. Transistor 146 has a first current electrode for providing C0P1, a control electrode for receiving a signal labelled SHLEFT, and a second current electrode coupled to the output terminal of inverter 112. Transistor 147 has a first current electrode for providing C0P2, a control electrode for receiving SHLEFT, and a second current electrode.

Transistor 148 has a first current electrode connected to $V_{DD}$, a control electrode for receiving a signal labelled PRECHARGE1, and a second current electrode connected to the second current electrode of transistor 144. Transistor 149 has a first current electrode connected to $V_{DD}$, a control electrode for receiving a signal labelled PRECHARGE, and a second current electrode coupled to the second current electrode of transistor 147. Transistor 150 has a first current electrode connected to $V_{DD}$, a control electrode for receiving PRECHARGE, and a second current electrode connected to the first current electrode of transistor 147. Transistor 151 has a first current electrode connected to $V_{DD}$, a control electrode for receiving PRECHARGE, and a second current electrode coupled to the first current electrode of transistor 146. Transistor 152 has a first current electrode connected to the first current electrode of transistor 146, a control electrode for receiving a signal labelled SHRIGHT, and a second current electrode coupled to the second current electrode of transistor 147. Transistor 153 has a first current electrode connected to the first current electrode of transistor 147, a control electrode for receiving SHRIGHT, and a second current electrode connected to the output terminal of inverter 114. Transistor 156 has a first current electrode connected to the second current electrode of transistor 144, a control electrode for receiving a signal labelled UPDATEL, and a second current electrode connected to the output terminal of inverter 114.

Transistor 161 has a first current electrode connected to $V_{DD}$, a control electrode coupled to the control electrode of transistor 125, and a second current electrode connected to the second current electrode of transistor 147. Transistor 162 has a first current electrode connected to $V_{DD}$, a control electrode coupled to the control electrode of transistor 135, and a second current electrode connected to the first current electrode of transistor 156. NAND gate 163 has a first input terminal connected to the second current electrode of transistor 147, a second input terminal connected to the second current electrode of transistor 144, and an output terminal connected to the control electrodes of transistors 125, 135, 161, and 162. Inverter 164 has an input terminal connected to the output terminal of NAND gate 163, and an output terminal connected to the control electrodes of transistors 126 and 136. Inverter 165 has an input terminal connected to the output terminal of inverter 113, and an output terminal for providing a signal labelled REGSEL(0). In carry chain 106, transistor 171 has a first current electrode for providing a signal labelled CCHAINOUT, a control electrode connected to the output terminal of inverter 111, and a second current electrode for receiving a signal labelled CCHAININ. Transistor 172 has a first current electrode connected to a positive power supply voltage terminal $V_{DD}$, at approximately 5 volts, a control electrode for receiving a signal labelled *STROBE, and a second current electrode. Transistor 173 has a first current electrode connected to the second current electrode of transistor 172, a control electrode connected to the output terminal of inverter 112, and a second current electrode. Transistor 175 has a first current electrode connected to the second current electrode of transistor 173, a control electrode for receiving a signal labelled CCEN, and a second current electrode connected to the second current electrode of transistor 147.

It is useful in understanding the operation of cell 20 first to understand the operation from the main portions, and then later, to understand the operation of the portions themselves. In cell 20, RAM cell 101 functions as a master and RAM cell 102 functions as a slave. Master portion 103 performs two basic functions. Transistors 121–124 serve to program RAM cell 101 from either a first bus, represented by CAB(0) and *CAB(0), or a second bus, represented by CBB(0) and *CBB(0). Transistors 125–128 serve to set and clear RAM cell 101 in response to INLEFT and CLEAR, respectively. Similar functions are provided in slave portion 104 by transistors 131–138. Update portion 105 serves to input and output values for the operand bit stored by cell 20, and to update the master bit and the slave bit in response to the direction of the shift, or alternatively stated, the value of the shift on the destination port.

Specifically, each RAM cell comprises two cross-coupled inverters, which store a data bit. When a new value is to be stored from the first bus, a differential signal is provided on CAB(0) and *CAB(0), and ENBA is asserted. ENBA makes transistors 121 and 122 conductive, and together transistors 121 and 122 overwrite a value stored in RAM cell 101 by coupling the true signal CAB(0) to the input terminal of inverter 111, and the complement signal to the input terminal of transistor 112. The true signal stored by RAM cell 101, therefore, resides on the output terminal of inverter 112. Similarly, transistors 123 and 124 are made conductive by ENBB when a value from the second bus, on CBB(0) and *CBB(0), is to be stored in RAM cell 101. In slave circuit portion 104, transistors 131 and 132 become conductive when ENBA is asserted, and a bit represented differentially on CAB(0) and *CAB(0) is stored in RAM cell 102. The output terminal of inverter 114 provides a true signal of RAM cell 102. Finally, transistors 133 and 134 couple signals from the second bus into RAM cell 102. If the contents of cell 20 are to be read on the first bus, READA is asserted, transistor 154 becomes conductive, and the bit stored in RAM cell 102 is driven onto signal line CAB(0). If the contents of cell 20 are to be read on the second bus, READB is asserted, transistor 155 becomes conductive, and the bit stored in RAM cell 102 is driven onto signal line CBB(0).

During a left shift, indicated by SHLEFT, a first port of cell 20, providing C0P1, becomes a source port, outputting the bit stored in RAM cell 101 to another cell, and a second port, receiving C0P7, becomes a destination port, receiving its bit from another cell. As was seen in FIG. 1, interconnection block 16 provides the shift paths to support multiple shift operations as defined by a plurality of control signals provided by control block 14. The plurality of control signals in turn are a function of signals supplied by microcode, encoded on lines ENCODE0-ENCODE21. SHLEFT makes transistors 146 and 147 conductive, and the bit stored in RAM cell 101 is provided as C0P1. C0P2 is received onto the first input terminal of NAND gate 163. Correspondingly, during a right shift, indicated by SHRIGHT, transistors 152 and 153 couple the bit stored in RAM cell 102 to C0P2, and receive C0P1 on the first input terminal of NAND gate 163. So, during a left shift, port 1 is the source port and port 2 is the destination port; and during a right shift, port 1 is the destination port, and port 2 is the source port.

Transistors 150 and 151 precharge C0P1 and C0P2 during phi1. Also during phi1, control signals (such as ROTATE, *ARITH, BYTE, X4CTRL, and X1CTRL described earlier) become stable to define interconnection paths based on the selected shift operation. During phi2, SHLEFT or SHRIGHT is asserted and source and destination ports are coupled together. During a subsequent phi1, within each cell, the bit received on the destination port from the last cycle updates the RAM cells.

To understand the update cycle, first note that NAND gate 163 receives the destination bit on the first input terminal, either C0P1 during a left shift, or C0P2 during a right shift. If the bit on the first input terminal is a logic high, then the output of NAND gate 163 is determined by the second input terminal. Because of the feedback provided by transistor 162, and the action of transistor 148 precharging the second input terminal of NAND gate 163, the output of NAND gate 163 resolves to a logic low, which reinforces the logic high level on the second input through transistor 162. Then, UPDATEL and UPDATER couple the logic high level into RAM cells 101 and 102. Since the output of NAND gate 163 is a logic low, transistors 125 and 135 are nonconductive. If the bit on the first input terminal is a logic low, then the output of NAND gate 163 is automatically a logic high. Transistors 125 and 135 are conductive, and control signals INLEFT and INRIGHT couple RAM cells 101 and 102 to $V_{SS}$.

Several features of the cells of shifter 10 of FIG. 1 allow shifter 10 to easily be used for an additional function, that of providing a register select decoder for an instruction such as MOVEM. Through either the first bus or the second bus a series of bits representing a register mask instead of an operand is loaded. Cell 20 supports such a function of providing an output to indicate if cell 20 has a rightmost bit storing a logic high (or equivalently, a binary 1), for clearing the bit after it has been indicated to be the rightmost cell, and for indicating to a next rightmost cell when no cells to the right of the next rightmost cell have a stored binary 1.

In performing such an operation, first binary 0 values are stored in all the slave RAM cells, and then the register mask is loaded into the master RAM cells. REGSEL(0) is now a logic low. CCEN is asserted, CCHAININ is driven to a logic high, and *STROBE is asserted. Transistor 172 is conductive, and since CCHAININ is a logic high, the voltage on the first current electrode of transistor 173 is a logic high. If the stored bit is a binary 1, transistor 173 is conductive, and because CCEN is asserted, transistor 175 is conductive, and a logic high is coupled to the first input terminal of NAND gate 163. The output of NAND gate 163 in turn becomes a logic low because the second input terminal of NAND gate 163 is precharged high, and then transistor 162 reinforces this level. This logic high then updates RAM cell 102 when UPDATEL is asserted during phi1 to store a binary 1, negating REGSEL(0). The output terminal of inverter 164 is a logic high, and CLEAR is asserted, clearing the bit in RAM cell 101. Finally, when RAM cell 101 stores the binary 0, transistor 171 is made conductive, because the control electrode of transistor 171 is coupled to a complement value of RAM cell 101. CCHAINOUT is asserted to cell 21. If cell 21 has a binary 1 stored in the master RAM cell, then a signal REGSEL(1) will be asserted as here and on a succeeding phi1 the CCHAINOUT signal will be asserted. If cell 21 stores a binary 0, however, a transistor in cell 21 corresponding to transistor 171 in cell 20 will be conductive and the signal CCHAINOUT from cell 20 will be coupled to cell 22. This process continues until all cells which store a binary 1 assert a register select signal for a clock period, and then assert a signal corresponding to CCHAINOUT. When the last cell asserts a signal corresponding to CCHAINOUT, control block 14 of FIG. 1 terminates the operation.

It should be apparent by now that a shifter for performing multiple shift operations, such as left shifts, right shifts, and rotates, by a variable amount, has been described. The shifter provides performance well in excess of a simple shifter, but consumes much less chip area than the barrel shifter. The shifter also allows implementation of register mask decoding using existing cells and control blocks. While boundary conditions for the byte rotate left X4 has been described, it should be apparent that return bus 71 can be used for additional types of boundary conditions not shown.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. A shifter in an integrated circuit for performing a plurality of shift operations on an operand, comprising:
   control means, for providing at least one control signal of a plurality of control signals in response to a selected shift operation;
   a plurality of cells, ordered from a leftmost cell to rightmost cell, for storing the operand, each cell thereof storing a bit of the operand;
   shift path means coupled to said plurality of cells and to said control means, for receiving said at least one control signal of said plurality of control signals, and for selectively coupling each cell to either, an adjacent cell, or a cell separated by a predetermined number of intervening cells; and
   return means coupled to said plurality of cells and to said control means, for coupling each of a predetermined set of cells of said plurality of cells to a corresponding cell in response to a boundary condition of said selected shift operation.

2. The shifter of claim 1 wherein said predetermined number of intervening cells is equal to three.

3. The shifter of claim 1 wherein each cell comprises:
   a first memory cell for storing a corresponding bit of the operand, and for selectively providing said corresponding bit during at least a first clock period of the shifter;
   a second memory cell for storing said corresponding bit of the operand, and for selectively providing said corresponding bit during at least said first clock period; and
   update means coupled to said first memory cell and said second memory cell, for selectively updating said corresponding bit in said first memory cell and said corresponding bit in said second memory cell during a second clock period with a new value in response to said selected shift operation.

4. The shifter of claim 3 wherein each memory cell comprises a source port and a destination port.

5. The shifter of claim 4 wherein during said selected shift operation said new value is received on said destination port, and wherein either said first memory cell or said second memory cell of each cell couples said corresponding bit to said source port in response to said selected shift operation.

6. The shifter of claim 3, wherein for all cells except said leftmost cell said first memory cell of each cell is selectively coupled to said second memory cell of a left adjacent cell, and wherein for all cells except said rightmost cell said second memory cell of each cell is selectively coupled to said first memory cell of a right adjacent cell, in response to said selected shift operation.

7. The shifter of claim 1 further comprising a carry chain, coupled to said plurality of cells and to said control means, for providing one of a plurality of first output signals, said first output signal corresponding to a rightmost cell whose stored bit of the operand is a binary '1', for clearing said stored bit of said rightmost cell in response to a clock signal, and for providing a second output signal when said stored bit is a binary '0'.

8. The shifter of claim 1 wherein said return means comprises a plurality of bus lines.

9. The shifter of claim 8 wherein said return means comprises a number bus lines is equal to said predetermined number of intervening cells plus one.

10. In a data processor for accessing a memory comprising:
    an execution unit, for storing data in response to a plurality of encoded signals;
    a microcode machine coupled to the execution unit, for providing the plurality of encoded signals in response to at least one operation code in the memory;
    a shifter for performing a plurality of shift operations on an operand, comprising:
       control means coupled to the microcode machine, for providing at least one control signal of a plurality of control signals in response to the encoded signals;
       a plurality of cells, ordered from a leftmost cell to rightmost cell, for storing the operand, each cell thereof storing a bit of the operand;
       shift path means coupled to said plurality of cells and to said control means, for receiving said at least one control signal of said plurality of control signals, and for selectively coupling each cell to either, an adjacent cell, or a cell separated by a predetermined number of intervening cells; and
       return means coupled to said plurality of cells and to said control means, for coupling a predetermined set of cells of said plurality of cells to a corresponding cell in response to a boundary condition of said selected shift operation.

11. The data processor of claim 10 wherein said predetermined number of intervening cells is equal to three.

12. A method for performing a shift operation on an operand, comprising:
    storing the operand in a plurality of cells, each cell comprising a bit of the operand and ordered from a leftmost to a rightmost;
    providing at least one control signal in response to the shift operation;
    storing the bit of each cell in either, an adjacent cell, or a cell separated by a predetermined number of intervening cells, in response to said at least one control signal and a direction of the shift operation; and
    storing the bit of each cell of a predetermined set of cells of said plurality of cells in a corresponding cell in response to a boundary condition of the shift operation.

13. The method of claim 12 wherein said predetermined number of intervening cells is equal to three.

* * * * *